United States Patent
Okada

(10) Patent No.: US 8,669,531 B2
(45) Date of Patent: Mar. 11, 2014

(54) RADIOGRAPHIC IMAGING DEVICE, RADIOGRAPHIC IMAGING METHOD, AND COMPUTER READABLE MEDIUM STORING RADIOGRAPHIC IMAGING PROGRAM

(75) Inventor: Yoshihiro Okada, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 190 days.

(21) Appl. No.: 13/305,744

(22) Filed: Nov. 29, 2011

(65) Prior Publication Data

US 2012/0138810 A1    Jun. 7, 2012

(30) Foreign Application Priority Data

Dec. 1, 2010    (JP) .................................. 2010-268734

(51) Int. Cl.
*G01T 1/16* (2006.01)
(52) U.S. Cl.
USPC .................................................... 250/370.09
(58) Field of Classification Search
USPC ........................................ 378/97; 250/370.09
See application file for complete search history.

(56) References Cited

U.S. PATENT DOCUMENTS 6,760,405 B2 * 7/2004 Ruetten et al. ............... 378/98.8
7,233,004 B2 * 6/2007 Nascetti et al. ........... 250/370.09

FOREIGN PATENT DOCUMENTS

JP    2008-212644 A    9/2008
JP    2009-219538 A    10/2009

* cited by examiner

*Primary Examiner* — Constantine Hannaher
(74) *Attorney, Agent, or Firm* — Solaris Intellectual Property Group, PLLC

(57) ABSTRACT

A radiographic imaging device includes a plurality of pixels, each having a generation section that generates charges according to irradiated radiation, an accumulation section that accumulates charges generated by the generation section, and a switching element that reads out the charges accumulated in the accumulation section, and that outputs electrical signals corresponding to the charges. The device also includes an amplification section that amplifies the electrical signals output from the switching elements and a setting section that sets an amplification factor of the amplification section corresponding to the charges accumulated during an accumulation period, during which charges are accumulated, based on the electrical signals output from radiation detection pixels during the accumulation period.

6 Claims, 12 Drawing Sheets

RADIOGRAPHIC IMAGING DEVICE, RADIOGRAPHIC IMAGING METHOD, AND COMPUTER READABLE MEDIUM STORING RADIOGRAPHIC IMAGING PROGRAM

CROSS-REFERENCE TO RELATED APPLICATION

This application claims priority under 35 USC 119 from Japanese Patent Application No. 2010-268734, filed on Dec. 1, 2010 the disclosure of which is incorporated by reference herein.

BACKGROUND OF THE INVENTION

1. Field of the Invention

The present invention relates to a radiographic imaging device, a radiographic imaging method, and a computer readable medium storing a radiographic imaging program. The present invention relates particularly to a radiographic imaging device, a radiographic imaging method, and a computer readable medium storing a radiographic imaging program, for imaging a medical radiographic image.

2. Description of the Related Art

Conventional radiographic imaging devices that perform radiographic imaging for medical diagnostic purposes, have been known. In such a radiographic imaging device, radiation irradiated from a radiation irradiation device and that has passed through an investigation subject is detected, and a radiographic image is imaged. In such a radiographic imaging device, radiographic imaging is performed by collecting and reading out charges generated according to the irradiated radiation.

Such a radiographic imaging device is provided with a radiation detection element for detecting radiation. The radiation detection element generates charges when irradiated either with radiation or with light that has been converted from the radiation. In the radiographic imaging device, the electrical signals corresponding to the generated charges is amplified in an amplification means before performing radiographic image read out (imaging).

The amplification factor for amplifying the electrical signals in the amplification means is set according to the magnitude of the electrical signals. Namely, the amplification factor of the amplification means is set according to the radiation dose irradiated (or the illumination amount of light converted from radiation).

Japanese Patent Application Laid-Open (JP-A) No. 2009-219538 discloses a technology that sets the gain of an amplification circuit when reading out the charges based on the radiation dose irradiated. In this technology, a current detection means is provided separately to an image detection circuit for detecting current flowing in a bias line for supplying a reverse bias voltage to a photoelectric conversion device.

Further, JP-A No. 2008-212644 discloses a technology for controlling an amplification factor in a read-out means, based on X-ray dose detected by a radiation monitor, such that a desired SN ratio is obtained in the image signal.

In the technology of JP-A No. 2009-219538, the circuit (device) size may be increased since the current detection means needs to be provided in the bias power source output section, in addition and separate to the image detection circuit. Namely, this technology may be difficult to implement in a small size and lightweight device such as a Flat Panel Detector (FPD) cassette. Furthermore, when the substrate is split into plural regions with gain set for each of the regions, higher precision detection is required to set gain appropriate to a relevant region for imaging an investigation subject, due to low charge amounts to be detected. A large scale detection circuit is required for performing high precision detection, resulting in the size of the device increasing. Furthermore, since the current detection means is provided at the bias power source, the supply current fluctuates according to the radiation dose irradiated, and may cause image noise.

In the technology disclosed in JP-A No. 2008-212644, the X-ray dose is detected by using a radiation monitor such as an Automatic Exposure Control device (AEC). Accordingly, a radiation monitor separate to a flat panel detector is required, and this may lead to increase in a device size. Further, the increase in size of the device may lead to increase of power consumption, and increase in the number of components. Furthermore, since the mechanism for detecting the radiation with the flat panel detector is different from the mechanism for detecting radiation with the radiation monitor, discrepancies arise in light exposure amounts detected depending on the irradiation conditions due to the sensitivity changing between the two detection systems when the X-ray irradiation dose (irradiation energy) changes.

SUMMARY OF THE INVENTION

The present invention provides a radiographic imaging device, a computer readable medium storing a radiographic imaging program and a radiographic imaging method capable of setting an amplification factor with high precision, according to an irradiated radiation dose while suppressing increase in size of the device.

A first aspect of the present invention is a radiographic imaging device including: a plurality of pixels each including, a generation section that generates charges according to irradiated radiation, an accumulation section that accumulates charges generated by the generation section, and a switching element that reads out the charges accumulated in the accumulation section, and that outputs electrical signals corresponding to the charges; an amplification section that amplifies the electrical signals output from the switching elements; and a setting section that sets an amplification factor of the amplification section corresponding to the charges accumulated during an accumulation period, during which charges are accumulated, based on the electrical signals output from radiation detection pixels during the accumulation period.

According to the present invention, the setting section sets the amplification factor of the amplification section, for use when amplifying the electrical signals corresponding to the charges accumulated in the accumulation section during the accumulation period, with the setting being based on the electrical signals output from radiation detection pixels during the accumulation period in which charges are accumulated in the accumulation section.

Accordingly, the present invention sets the amplification factor of the amplification section for amplifying the electrical signals corresponding to the accumulated charges based on the electrical signals output from the pixel during the accumulation period. Namely, the amplification factor of the amplification section is set for reading out the radiation according to the irradiated radiation dose.

In the present invention, there is no requirement to separately provide a section for detecting radiation in order to set the amplification factor based on the electrical signals output from the radiation detection pixels during the accumulation period in which charges is accumulated in the accumulation section.

Consequently, according to the radiographic imaging device of the present invention, the amplification factor can be set with high precision according to the radiation dose irradiated while suppressing increase in size of the device.

A second aspect of the present invention, in the first aspect, the radiation detection pixels may each include a switching element that reads out the charges and outputs the electrical signals that corresponds to the charges, irrespective of a switching state.

According to the above aspect, by employing the pixel that is provided with a switching element that reads out the charges and outputs the electrical signals irrespective to switching state, negates any requirement for switching element control.

A third aspect of the present invention, in the above aspects, a plurality of signals lines may be connected to the plurality of pixels, and the setting section may set the amplification factor of the amplification section based on the electrical signals output from the radiation detection pixels that are connected to a portion of the signal lines.

A fourth aspect of the present invention, in the above aspects, the amplification section may be provided for each of the plurality of signal lines, and the setting section may set the same amplification factor in all of the amplification sections.

A fifth aspect of the present invention, in the above aspects, the setting section may set the amplification factor in the amplification section based on electrical signals output from the radiation detection pixels provided at a position corresponding to the imaging position of an investigation subject for radiographic imaging.

According to the above aspect, more optimum amplification factor may be set by setting the electrical signals output from the radiation detection pixels provided at a position corresponding to the imaging position of the investigation subject, which is the imaging position of the radiographic image, and accordingly, appropriate radiographic images may be obtained.

A sixth aspect of the present invention is a radiographic imaging method of an radiographic imaging device including a plurality of pixels each including a generation section that generates charges according to irradiated radiation, an accumulation section that accumulates charges generated by the generation section, and a switching element that read out the charges accumulated in the accumulation section, and that outputs an electrical signals corresponding to the charges, and an amplification section that amplifies the electrical signals output from the switching elements, the method including: setting an amplification factor of the amplification section corresponding to the charges accumulated during an accumulation period, during which charges are accumulated, based on the electrical signals output from radiation detection pixels during the accumulation period; and output a image data corresponding to the electric signals amplified with the set amplification factor.

A seventh aspect of the present invention is a computer readable storage medium storing a radiographic imaging program for causing a computer to perform a process for imaging a radiographic image with a radiographic imaging device including a plurality of pixels each including, a generation section that generates charges according to irradiated radiation, an accumulation section that accumulates charges generated by the generation section, and a switching element that read out the charges accumulated in the accumulation section, and that outputs electrical signals corresponding to the charges, and an amplification section that amplifies the electrical signals output from the switching elements, the process includes: setting an amplification factor of the amplification section corresponding to the charges accumulated during an accumulation period, during which charges are accumulated, based on the electrical signals output from radiation detection pixels during the accumulation period; and output a image data corresponding to the electric signals amplified with the set amplification factor.

According to the above aspects of the present invention, an amplification factor can be set with high precision according to the irradiated radiation dose, while suppressing increase in the size of the device.

BRIEF DESCRIPTION OF THE DRAWINGS

Exemplary embodiments of the present invention will be described in detail based on the following figures, wherein.

DETAILED DESCRIPTION OF THE INVENTION

Explanation follows regarding an exemplary embodiment, with reference to the drawings.

Figure 1:
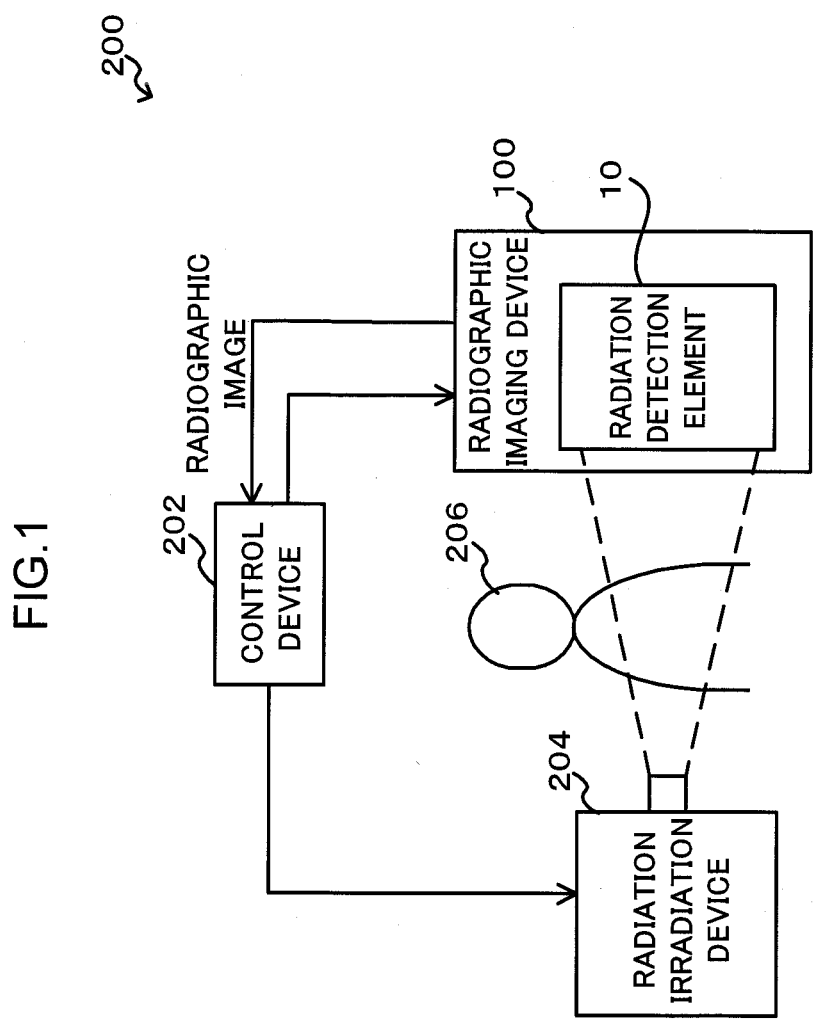
FIG. 1 is a schematic diagram illustrating a configuration of a radiographic imaging system according to a present exemplary embodiment.

Hereinafter, explanation regarding a schematic configuration of a radiographic imaging system in which a radiographic imaging device of the present exemplary embodiment is employed will be described. FIG. 1 is a schematic diagram of a radiographic imaging system of the present exemplary embodiment.

A radiographic imaging system 200 is configured with: a radiation irradiation device 204 for irradiating radiation (such as X-rays) onto an investigation subject 206; a radiographic imaging device 100 equipped with a radiation detection element 10 for detecting radiation that was irradiated from the radiation irradiation device 204 and has passed through the investigation subject 206; and a control device 202 for instructing radiographic imaging and for acquiring a radiographic image from the radiographic imaging device 100. Radiation irradiated from the radiation irradiation device 204, at a timing under control of the control device 202, is irradiated onto the investigation subject 206 positioned at an imaging position. The radiation is then irradiated onto the radiographic imaging device 100 by passing through the investigation subject 206.

Explanation now follows regarding a schematic configuration of the radiographic imaging device 100 of the present invention. In the present exemplary embodiment, explanation will be given when the present invention is applied with an indirect-conversion-type of radiation detection element 10, in which radiation such as X-rays is first converted into light, and is then converted into charges. In the present exemplary embodiment the radiographic imaging device 100 is configured with the radiation detection element 10 of an indirect-conversion-type. A scintillator for converting radiation into light is omitted in FIG. 2.

Plural pixels 20 are arrayed in a matrix in the radiation detection element 10. Each of the pixels 20 includes a sensor section 103 that receives light, generates charges and accumulates the generated charges, and a TFT switch 4 that is a switching element for reading out the charges accumulated in the sensor section 103. In the present exemplary embodiment the sensor section 103 generates charges on irradiation with light that has been converted by the scintillator.

Figure 2:
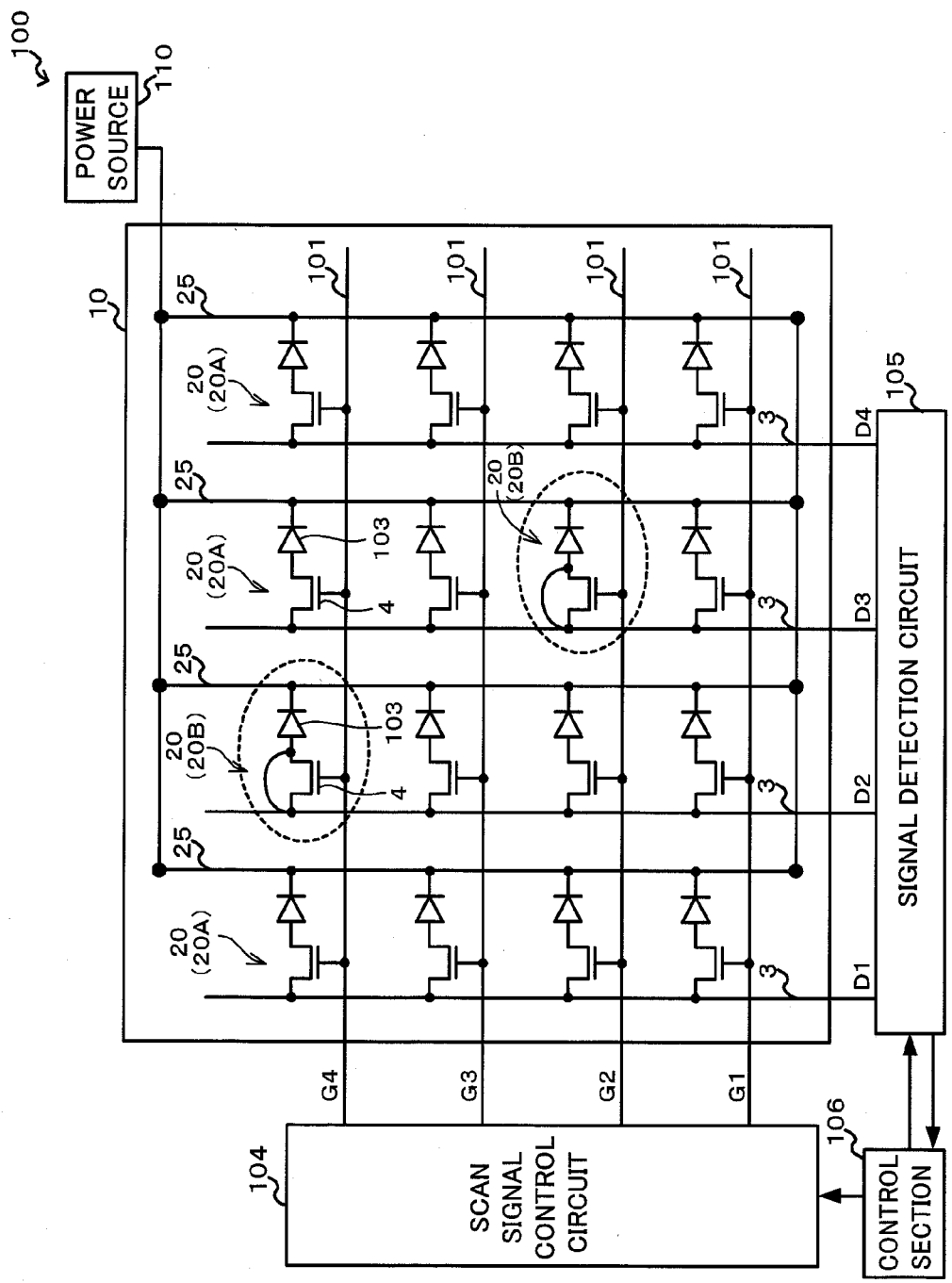
FIG. 2 is a configuration diagram illustrating the overall configuration of a radiographic imaging device according to the present exemplary embodiment.

The plural pixels 20 are disposed, in a matrix, along a specific direction (the across direction in FIG. 2, referred to below as "row direction"), and a direction orthogonal to the row direction (the vertical direction in FIG. 2, referred to below as "column direction"). The array of the pixels 20 is simplified in FIG. 2, however an example is an array with 1024×1024 individual pixels 20 disposed respectively in the row direction and the column direction.

In the present exemplary embodiment the pixels 20 are predetermined as being either pixels 20A (radiographic imaging pixels 20A) employed for radiographic imaging or pixels 20B (radiation detection pixels 20B) employed for radiation detection. The radiation detection pixels 20B are encircled by dotted lines in FIG. 1. The radiographic imaging pixels 20A are pixels employed for detecting radiation to generate an image expressing the radiation, and the radiation detection pixels 20B are pixels employed for detecting radiation and are pixels that output charges even during a charge accumulation period (described in detail later).

In the radiation detection element 10 plural scan lines 101 are provided on a substrate 1 (see FIG. 3) for switching the TFT switched 4 ON or OFF, and plural signal lines 3 are provided orthogonal to the scan lines 101 for reading out charges accumulated in the sensor sections 103. In the present exemplary embodiment, a single signal line 3 is provided along the specific direction for each pixel row, and a single scan line 101 is provided along the orthogonal direction for each pixel row. For example, when there are 1024×1024 individual pixels 20 respectively in the row direction and the column direction there are also 1024 signal lines 3 and 1024 scan lines 101 provided.

Common electrode lines 25 are provided along the signal lines 3 in the radiation detection element 10. The first ends and second ends of the common electrode lines 25 are connected together in parallel, with the first ends connected to a power source 110 that supply a specific bias voltage. The sensor sections 103 are connected to the common electrode lines 25 and are applied with a bias voltage through the common electrode lines 25.

Control signals for switching each TFT switches 4 flow in the scan lines 101. Each of the TFT switches 4 are switched by the control signals flowing in each of the scan lines 101.

Electrical signals corresponding to charges that have been accumulated in each of the pixels 20 flow in the signal lines 3 depending on the switching state of each of the TFT switches 4 of the pixels 20. More specifically, by switching ON the TFT switch 4 of the pixel 20 connected to a given signal line 3, an electrical signals flow in the given signal line 3 corresponding to the charges that have been accumulated in the pixel 20.

The signal lines 3 are connected to a signal detection circuit 105 for detecting the electrical signals flowing out of each of the signal lines 3. Further, the scan lines 101 are connected to a scan signal control circuit 104 that output control signals for switching the TFT switches 4 ON or OFF, to each of the scan lines 101. In FIG. 2, only a single signal detection circuit 105 and a single scan signal control circuit 104 has been illustrated, however for example, plural signal detection circuits 105 and the scan signal control circuits 104 are provided, and are each connected to a specific number (for example 256) of the signal lines 3 or the scan lines 101. For example when there are 1024 lines provided for both the signal lines 3 and the scan lines 101, four of the scan signal control circuits 104 are provided, connected one for every 256 of the scan lines 101, and four of the signal detection circuits 105 are provided, connected one for every 256 of the signal lines 3.

The signal detection circuit 105 includes an amplification circuit (see FIG. 6) for each of the signal lines 3 to amplify input electrical signals. In the signal detection circuit 105, each of the electrical signals input from the signal lines 3 is amplified by the amplification circuit, and is converted to a digital signal by an analogue-to-digital converter (ADC).

A control section 106 is connected to the signal detection circuits 105 and the scan signal control circuits 104. The control section 106 performs specific process, such as noise reduction process, on the digital signals converted in each of the signal detection circuit 105, outputs a control signal to each of the signal detection circuits 105 instructing a timing for signal detection, and outputs to each of the scan signal control circuit 104 a control signal instructing a timing for output of scan signals.

The control section 106 in the present exemplary embodiment is configured by a microcomputer including a Central Processing Unit (CPU), ROM and RAM, and a nonvolatile storage section, such as flash memory. The control section 106 then subjects the image data that has been subjected to the above specific process to further process to interpolate image data for the radiation detection pixels 20B (interpolation processing), and the control section 106 generates an image expressing irradiated radiation. Namely, the control section 106 generates an image expressing the irradiated radiation by interpolating image data for the radiation detection pixels 20B by using the image data subjected to the above specific processing.

Figure 3:
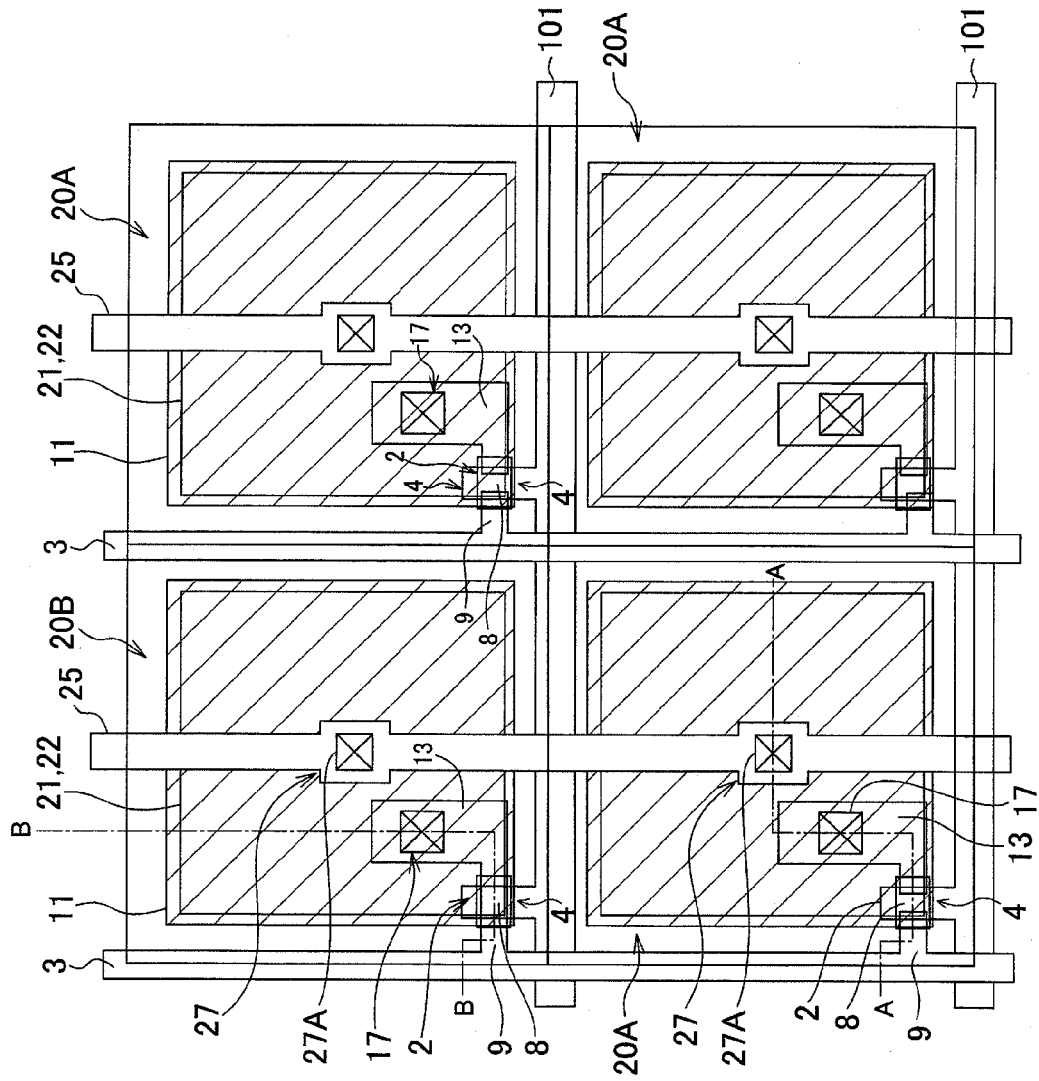
FIG. 3 is a plan view illustrating a configuration of a radiation detection element according to the present exemplary embodiment.

FIG. 3 is a plan view illustrating a structure of the indirect-conversion-type radiation detection element 10 according of the present exemplary embodiment.

Figure 4:
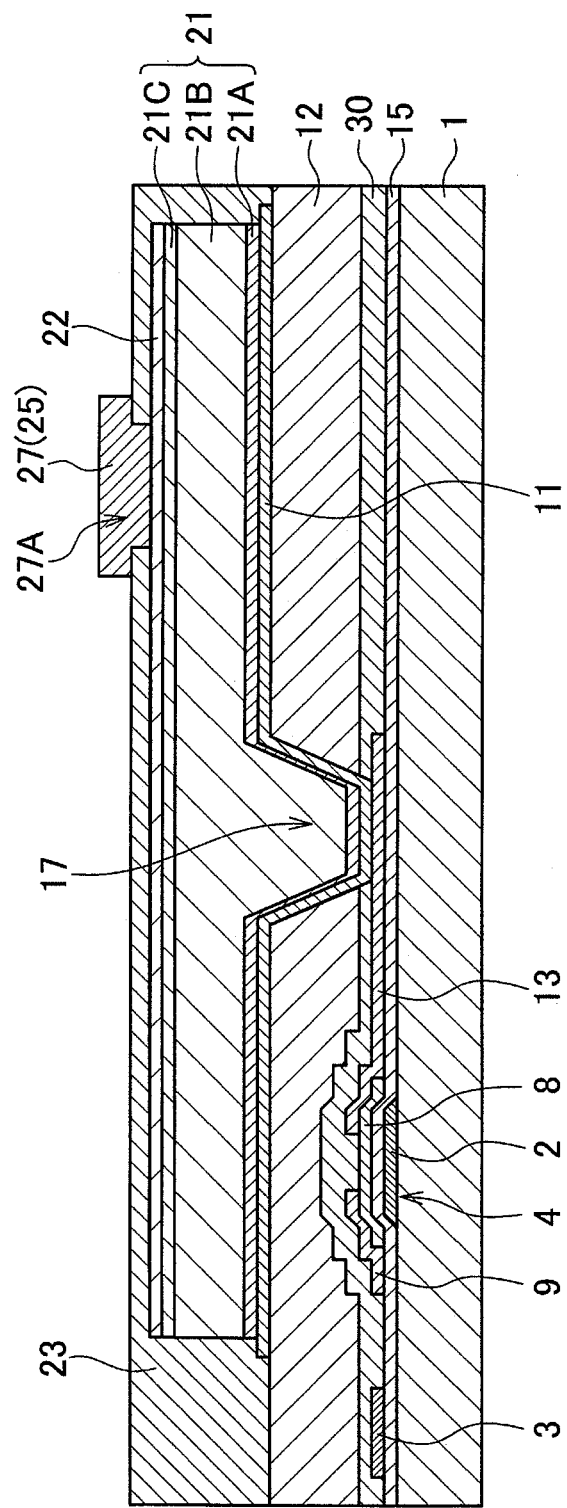
FIG. 4 is a cross-sectional view of a radiation detection element according to the present exemplary embodiment.
Figure 5:
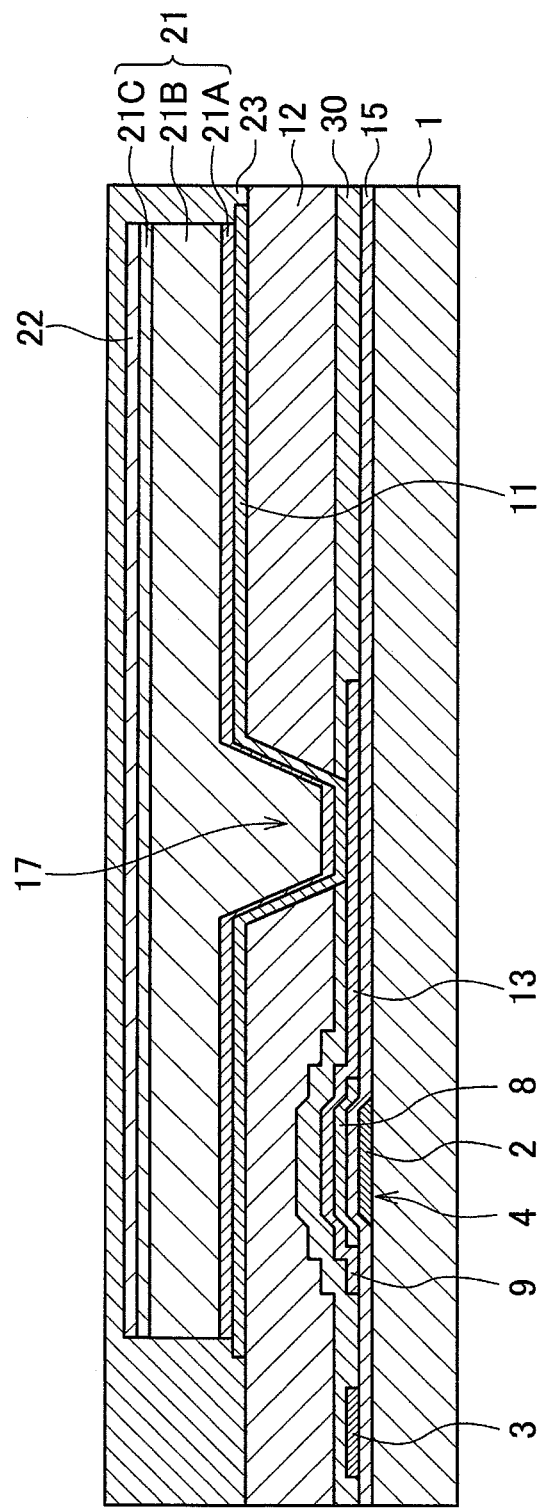
FIG. 5 is a cross-sectional view of a radiation detection element according to the present exemplary embodiment.

FIG. 4 is a cross-sectional view of a radiographic imaging pixel 20A, taken on line A-A of FIG. 3. FIG. 5 is a cross-sectional view of a radiographic detection pixel 20B, taken on line B-B of FIG. 3.

As shown in FIG. 4, in the pixel 20A of the radiation detection element 10, a scan line 101 (see FIG. 3) and a gate electrode 2 is formed on the insulating substrate 1 made of a material such as alkali-free glass, and the scan line 101 and the gate electrode 2 are connected to each other (see FIG. 3). The wiring layer in which the scan line 101 and the gate electrode 2 are formed (this wiring layer is referred to below as the first signal wiring layer) is formed of Al and/or Cu, or with a layered film with a main component of Al and/or Cu. However the materials of the first signal wiring layer is not limited thereto.

An insulation film 15 is formed on the surface of the first signal wiring layer, and the portion of the insulation film 15 above the gate electrode 2 acts as a gate insulation film of the TFT switch 4. The insulation film 15 is formed of, for example, $SiN_x$ by, for example, Chemical Vapor Deposition (CVD).

An island shape semiconductor active layer 8 is formed above the insulation film 15 on the gate electrode 2. The semiconductor active layer 8 is a channel portion of the TFT switch 4 and is, for example, formed from an amorphous silicon film.

A source electrode 9 and a drain electrode 13 are formed in a layer above. The signal lines 3 are also formed in the wiring layer in which the source electrode 9 and the drain electrode 13 are formed. The source electrode 9 is connected to the signal line 3 (see FIG. 3). The wiring layer in which the source electrodes 9, the drain electrodes 13 and the signal lines 3 are formed (this wiring layer is referred to below as the second signal wiring layer) is formed with Al and/or Cu, or with a layered film with a main component of Al and/or Cu. However, the material of the second signal wiring layer is not limited thereto. Between the semiconductor active layer 8 and both the source electrode 9 and the drain electrode 13, an impurity doped semiconductor layer (not shown in the drawings) is formed from a material such as impurity doped amorphous silicon. The TFT switch 4 used for switching is configured by the above configuration. Note that, in TFT switch 4, the source electrode 9 and the drain electrode 13 may be reversed according to the polarity of the charges collected and accumulated by a bottom electrode 11.

A TFT protection layer 30 to protect the TFT switches 4 and the signal lines 3 is formed covering the second signal wiring layer over substantially the whole of the region provided with the pixels 20 on the substrate 1 (substantially the entire region). The TFT protection layer 30 is formed for example from $SiN_x$ using for example CVD film forming.

A coated intermediate insulation film 12 is formed on the TFT protection layer 30. The intermediate insulation film 12 is formed by a low permittivity (specific permittivity $\epsilon$ r=2 to 4) photosensitive organic material (examples of such materials include, positive working photosensitive acrylic resins materials with a base polymer formed by copolymerizing methacrylic acid and glycidyl methacrylate, mixed with a naphthoquinone diazide positive working photosensitive agent) at a film thickness of 1 μm to 4 μm.

In the radiation detection element 10 according to the present exemplary embodiment, inter-metal capacitance between metal disposed in the layers above and below the intermediate insulation film 12 is suppressed low, by the intermediate insulation film 12. Generally such materials also function as a flattening layer that flattens steps in the layers below. In the radiation detection element 10 of the present exemplary embodiment, a contact hole 17 is formed at a position corresponding to the intermediate insulation film 12, and the drain electrode 13 of the TFT protection layer 30.

The bottom electrode 11 of the sensor section 103 is formed above the intermediate insulation film 12 so as to cover the pixel region while also filling the contact hole 17. The bottom electrode 11 is connected to the drain electrode 13 of the TFT switch 4. When the thickness of a semiconductor layer 21 is about 1 μm, there are substantially no limitations to the material of the bottom electrode 11, as long as it is an electrically conductive material. The bottom electrode 11 may therefore be configured by a conductive metal such as an aluminum material or ITO.

However, when the film thickness of the semiconductor layer 21 is thin (about 0.2 μm to 0.5 μm), since there is insufficient light absorption in the semiconductor layer 21, an alloy or layered film with a main component of a light blocking metal is preferably employed for the bottom electrode 11, in order to prevent an increase in leak current occurring due to light illumination onto the TFT switch 4.

The semiconductor layer 21 functioning as a photodiode is formed over the bottom electrode 11. In the present exemplary embodiment a PIN structure photodiode is employed for the semiconductor layer 21, with a n+ layer, i layer, and p+ layer (n+ amorphous silicon, amorphous silicon, p+ amorphous silicon), configured as stacked layers of an n+ layer 21A, an i layer 21B, and a p+ layer 21C, in sequence from the lower layer. The i layer 21B generates charges (pairs of a free electron and a free hole) due to illumination of light. The n+ layer 21A and the p+ layer 21C function as contact layers, electrically connecting the i layer 21B to the bottom electrode 11 and to upper electrode 22.

Individual upper electrodes 22 are respectively formed above the semiconductor layers 21. The upper electrodes 22 employ a material with high light transmissivity such as, for example, ITO or Indium Zinc Oxide (IZO). The radiation detection element 10 of the present exemplary embodiment is configured with the sensor sections 103 each configured to include the upper electrode 22, the semiconductor layer 21 and the bottom electrode 11.

A coated intermediate insulation film 23 is formed over the intermediate insulation film 12, the semiconductor layer 21 and the upper electrode 22. The intermediate insulation film 23 has an opening 27A facing a portion of each of the upper electrodes 22, and is formed to cover each of the semiconductor layers 21.

A common electrode wiring 25 is formed over the intermediate insulation film 23 with Al and/or Cu, or with an alloy or layered film with a main component of Al and/or Cu. The common electrode wiring 25 is formed with a contact pad 27 in the vicinity of the opening 27A, and is electrically connected to the upper electrode 22 through the opening 27A in the intermediate insulation film 23.

As shown in FIG. 5, in the radiation detection pixels 20B of the radiation detection element 10 the TFT switches 4 are each formed such that the source electrode 9 and drain electrode 13 make contact. Namely, in each of the pixels 20B, the source and the drain of the TFT switches 4 are shorted. Accordingly, in the pixels 20B, charges collected in the bottom electrode 11 flows out in the signal line 3 irrespective of the switching state of the TFT switch 4.

In the radiation detection element 10 configured as described above, a protective film formed from an insulating material with low light absorption characteristics may also be employed as required, and the scintillator configured from a material such as GOS is adhered to the surface using an adhesive resin with low light absorption.

Figure 6:
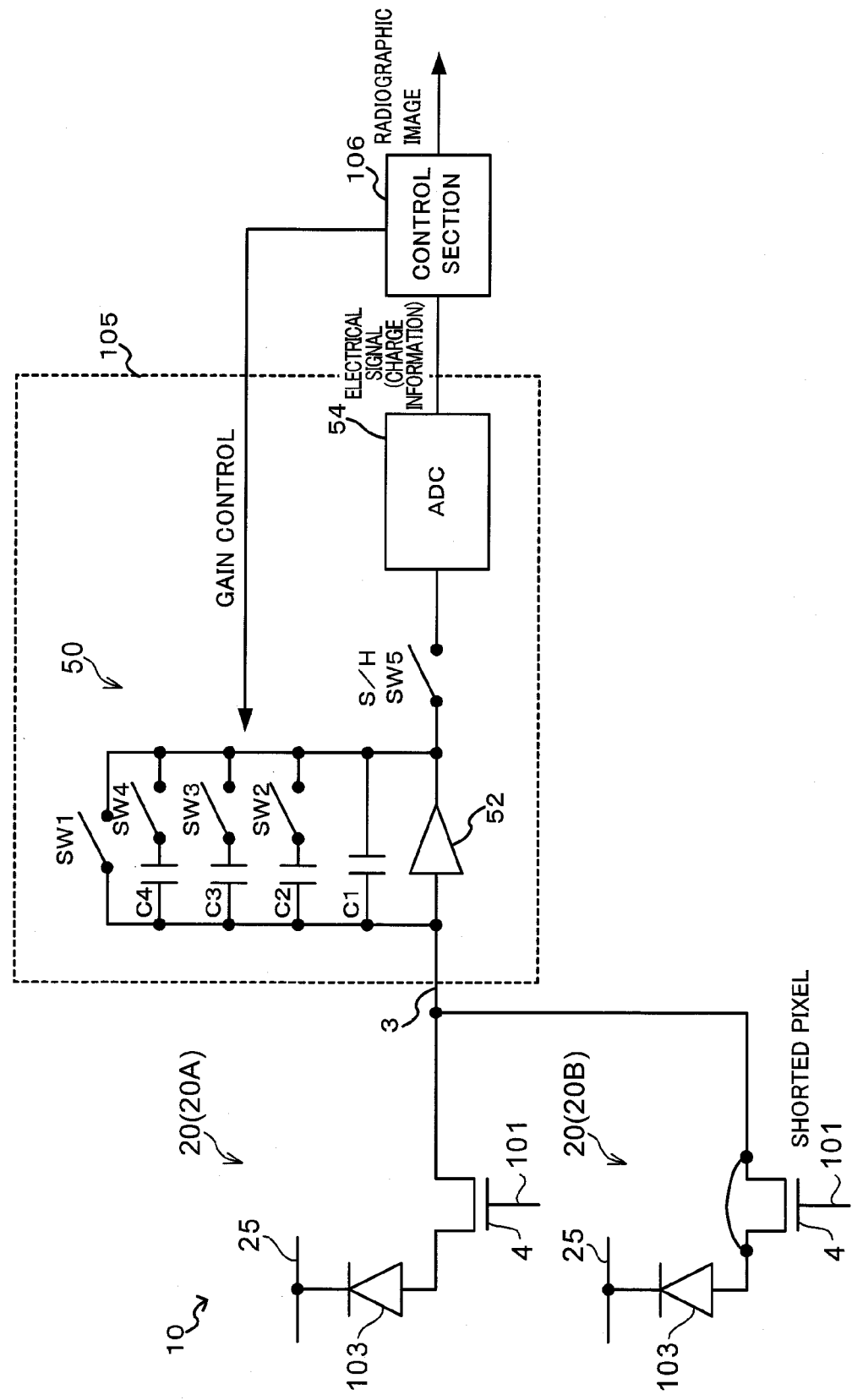
FIG. 6 is a schematic diagram illustrating a schematic configuration of a signal detection circuit of a radiographic imaging device according to the present exemplary embodiment.

Explanation follows regarding a schematic configuration of the signal detection circuit 105 of the present exemplary embodiment. FIG. 6 is a schematic diagram of the signal detection circuit 105 of the present exemplary embodiment. The signal detection circuit 105 of the present exemplary embodiment is configured with an amplification circuit 50 and an analogue-to-digital converter (ADC) 54. Note that while simplified in the drawing of FIG. 6, one of the amplification circuits 50 is provided one for each of the signal lines 3. Namely, the signal detection circuit 105 is provided with plural of the amplification circuits 50, with this being the same number as the number of the signal line 3 of the radiation detection element 10.

The amplification circuit 50 is configured as a charge amplifier circuit and includes an amplifier 52 such as an operational amplifier, condensers C1 to C4 each connected to the amplifier 52 in parallel, and a switch SW1 employed for charge resetting also connected in parallel to the amplifier 52. Switches SW2 to SW4 are respectively connected in series to the radiation condensers C2 to C4, and switching ON or OFF of the charges reset switch SW1 and the switches SW2 to SW4 are control by the control section 106.

In the amplification circuit 50, charges (electrical signals) are read by the TFT switch 4 of the pixel 20 with the charge reset switch SW1 in the OFF state, and charges read out by the TFT switch 4 is accumulated in the condenser C1 and the condensers C2 to C4 whose switch(es) SW2 to SW4 is/are in the ON state, such that the voltage value output from the amplifier 52 is amplified according to the amount of charges accumulated. The amplification factor of each of the amplification circuits 50 is determined by switching ON switch(es) SW2 to SW4 and then accumulating charges in the condenser (s) C1 to C4. When charges is accumulated in one condenser C (C1 to C4), the capacity of the condenser is given by V=Q/C (wherein V is voltage, Q is charges and C is capacity). However, when charges is accumulated in plural condensers, such as for example when the switch SW2 is switched ON and charges is accumulated in the condensers C1, C2, then V=Q/(C1+C2).

The condensers C1 to C4 may have different capacities from each other, or may have the same capacity as each other. The capacity and the number of the condensers C1 to C4 is preferably appropriately set according to such factors as the properties required of the radiographic imaging device 100.

The control section 106 applies a charges reset signal applied to the charges reset switch SW1 to control switching ON or OFF of the charges reset switch SW1. The input side and the output side of the amplifier 52 are shorted when the charges reset switch SW1 is in the ON state, and the charges of the condensers C1 to C4 is discharged.

When a sample and hold (S/H) switch SW5 is in an ON state, the ADC 54 functions to convert analogue electrical signals input from the amplification circuit 50 into digital signals. The ADC 54 outputs the digitally converted electrical signals in sequence to the control section 106.

The ADC 54 of the present exemplary embodiment is input with electrical signals output from all of the amplification circuits 50 provided to the signal detection circuits 105. Namely, in the present exemplary embodiment the signal detection circuit 105 is provided with a single ADC 54 irrespective of the number of the amplification circuits 50 (the number of the signal lines 3).

The control section 106 of the present exemplary embodiment sets the amplification circuits 50 with an amplification factor according to the charges information (radiation dose) based on the electrical signals output from the ADC 54. The amplification factor is set to a small amplification factor when the amount of charges is high (high radiation dose) and is set to a large amplification factor when the amount of charges is low (low radiation dose). Accordingly configuration is set such that the output of the ADC 54 falls within a specific range in order to efficiently utilize the conversion range of the ADC 54.

In the present exemplary embodiment configuration may be made such that the control section 106 is pre-stored with correspondence relationships between the magnitude of charges amount (radiation dose) based on the electrical signals (charges information) output from the ADC 54, and which of the condensers C1 to C4 are to be used for charge accumulation (which of the switches SW2 to SW4 are to be switched ON). Then the amplification factor (gain) is set according in the amplification circuits 50 by controlling switching ON or OFF of the switches SW2 to SW4, according to the output electrical signals, such that the appropriate condensers C2 to C4 are selected for charges accumulation.

Explanation follows regarding a flow of operations during radiographic imaging with the radiographic imaging device 100 configured as described above, with reference to FIG. 7 and FIG. 8, and focusing on setting (control) of the gain of the amplification circuits 50.

Figure 7:
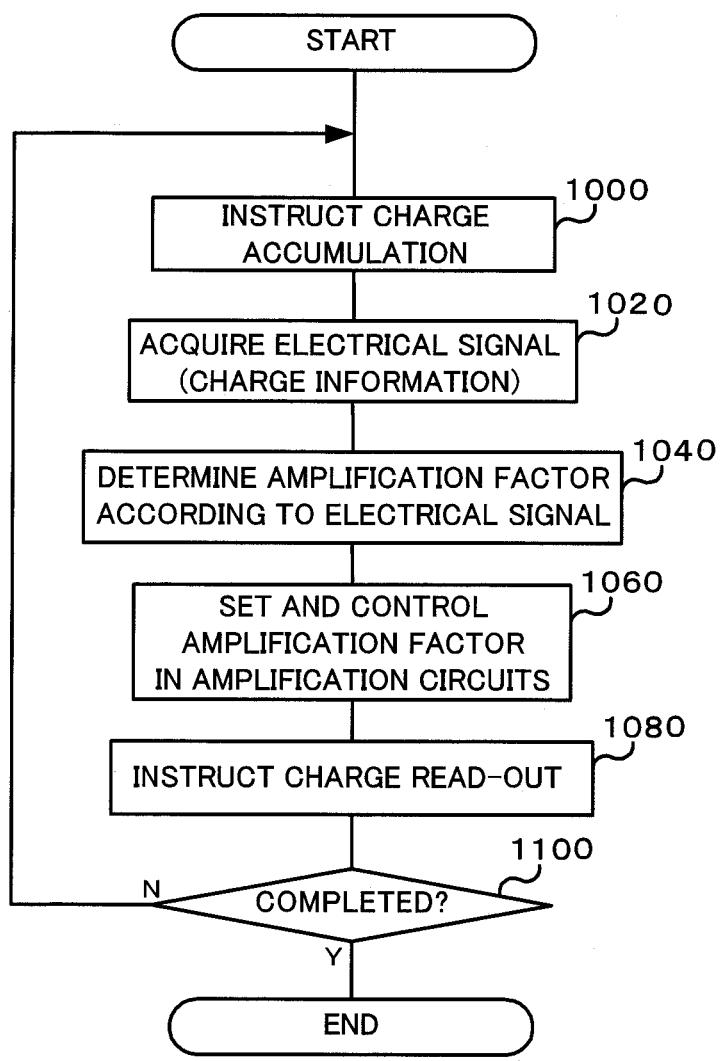
FIG. 7 is a flow chart schematically illustrating an operation executed in a control section of a radiographic imaging device according to the present exemplary embodiment, when imaging a radiographic image.
Figure 8:
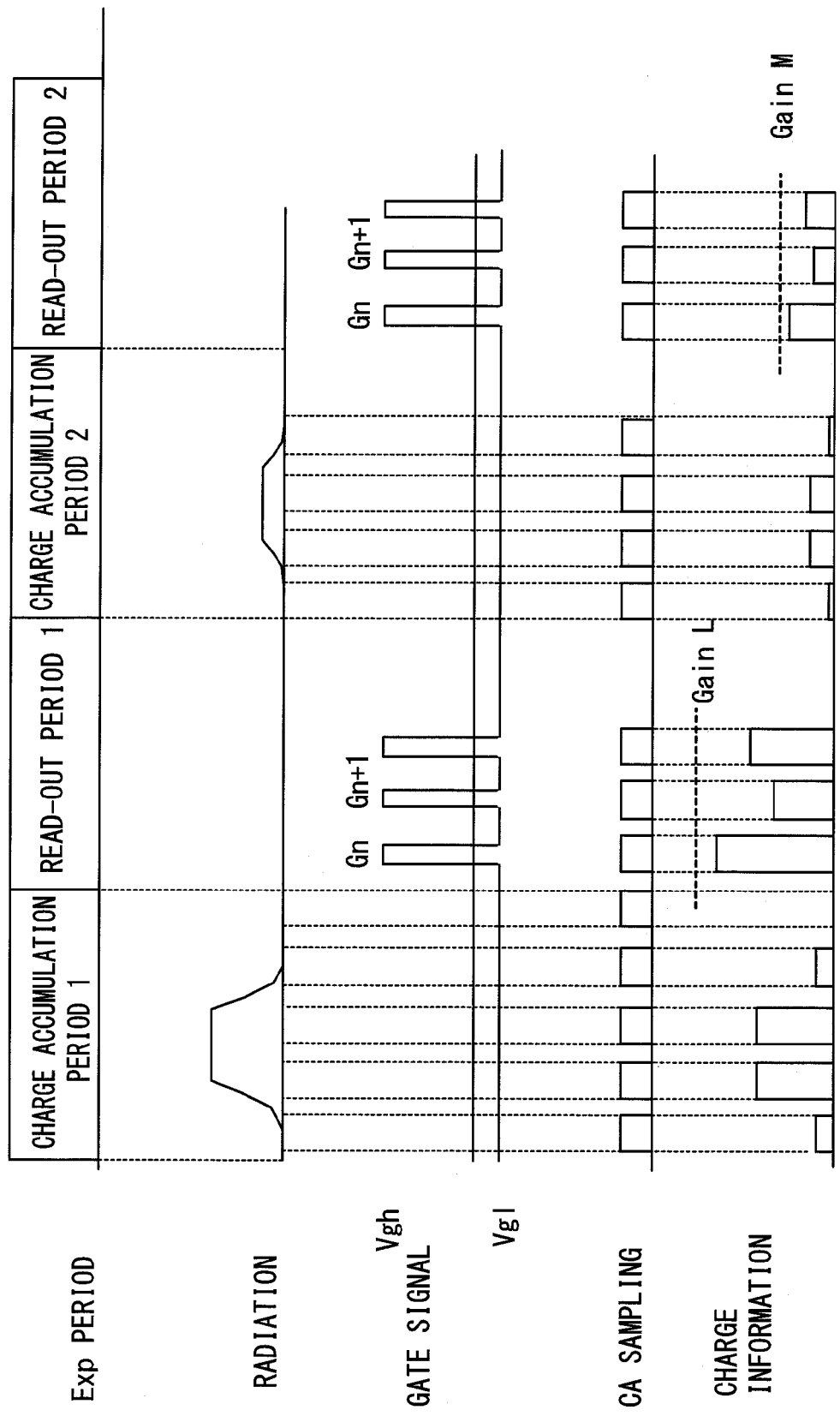
FIG. 8 is a timing chart schematically illustrating a flow of operation in a radiographic imaging device according to the present exemplary embodiment, when imaging a radiographic image.

FIG. 7 is a flow chart schematically illustrating an operation executed by the control section 106 of the radiographic imaging device 100 of the present exemplary embodiment during radiographic imaging. FIG. 8 is a timing chart illustrating a flow of operations during radiographic imaging.

In the radiographic imaging device 100, the start of radiation irradiation is detected, each of the pixels 20 of the radiation detection element 10 accumulates charges, and a radiographic image is imaged by outputting a radiographic image based the accumulated charges.

In the present exemplary embodiment, during radiographic imaging, the radiographic imaging device 100 is notified to transition to imaging mode by the control device 202. When notified to transition to the imaging mode, the radiographic imaging device 100 transitions to a radiation detection standby state, in which detection for radiation is performed. When radiation is detected, the radiographic imaging device 100 transitions to a charge accumulation state in which charges are accumulated in the radiation detection element 10. The radiographic imaging device 100 transitions to a charge reading state for reading out the charges accumulated after a specific duration has elapsed from when radiation was detected. The radiographic imaging device 100 transitions to a standby state when charges read out has been completed.

When radiation is irradiated from the radiation irradiation device 204, the irradiated radiation is absorbed by the scintillator and converted into visible light. Note that the radiation may be irradiated onto either the front face or the back face of the radiation detection element 10. The light converted to visible light by the scintillator is illuminated onto the sensor section 103 in each of the pixels 20.

Charges are generated inside the sensor sections 103 due to illumination of light. The generated charges are collected by the bottom electrodes 11.

In the radiographic imaging pixels 20A, the charges are collected in the bottom electrode 11, and are accumulated due to the drain electrode 13 and the source electrode 9 not being shorted. However, in the pixels 20B the charges collected in the bottom electrode 11 flows out to the respective signal line 3 due to the drain electrode 13 and the source electrode 9 being shorted.

The flow chart illustrated in FIG. 7 is executed by the control section 106 when the radiographic imaging device 100 has transitioned to the imaging mode, and radiation irradiation has been detected. The radiographic imaging device 100 of the present exemplary embodiment is configured such that for radiation irradiation detection a control signal from the control device 202 is not required, namely a synchronization-free configuration. This is achieved by the control section 106 comparing the value of the digital signal converted by the signal detection circuits 105 from the signal lines 3 connected to the radiation detection pixels 20B (in FIG. 2 at least one of D2 and/or D3, for example D2) against a predetermined threshold value employed for radiation detection. The control section 106 then determines whether radiation irradiation has been detected by whether the value is the threshold value or greater. There is however no limitation to such a configuration and, for example, radiation irradiation may be detected by a control signal input from the control device 202.

When radiation irradiation has been detected, at step 1000 the control section 106 instructs the radiation detection element 10 to accumulate charges. Due to the TFT switches 4 in the radiographic imaging pixels 20A of the radiation detection element 10 being already in the OFF state, a state is achieved in which charges is accumulated (see the charge accumulation period of the Exp periods in FIG. 8).

Then at step 1020, the electrical signals (charge information) output from the signal detection circuit 105 is acquired. Charges is output to the signal detection circuit 105 even during the charge accumulation period (when the TFT switches 4 are in the OFF state) in the radiation detection pixels 20B due to their TFT switches 4 being shorted. The S/H switch SW5 is switched ON or OFF at specific timings independent of the charge accumulation period, and the read out period (see the CA sampling in FIG. 8). Hence, charge information output from the radiation detection pixels 20B is input as electrical signals to the control section 106 through the amplification circuits 50 of the signal detection circuit 105 and the ADC 54.

Then at step 1040, the amplification factor of the amplification circuits 50 is determined according to the electrical signals during an accumulation period. Then at step 1060, the gain of the amplification circuits 50 is controlled by setting the determined amplification factor in the amplification circuits 50 of the signal detection circuit 105. Setting the amplification factor is accomplished as explained above by switching the switches SW2 to SW4 into ON state, according to the amplification factor.

Next at step 1080 instruction is given to read out the charges in the pixels 20 of the radiation detection element 10 (the radiographic imaging pixels 20A). Specifically, the scan signal control circuit 104 is controlled, and an ON signal is output from the scan signal control circuit 104 one line at a time in sequence to the scan lines 101 (see the gain signal Vgh in FIG. 8). The ON signal is applied through the scan lines 101 in sequence to the gate electrodes 2 of the TFT switches 4. The TFT switches 4 of the plural arrayed pixels 20A are thereby switched ON in sequence, causing electrical signals, according to the amount of charges accumulated in each of the pixels 20A, to flow out in the signal lines 3. In the amplification circuits 50 of the signal detection circuit 105, the electrical signals that have flowed out in the signal lines 3 are amplified by the amplification factor that was set at step 1060, and then output to the ADC 54. As shown in FIG. 8, the amplification factor is set small (see the charge accumulation period 1, the read out period 1, and Gain L in FIG. 8) when the amount of changes is large (the radiation dose irradiated is high), and the amplification factor is set to an intermediate level (see the charge accumulation period 2, the read out period 2, and Gain M in FIG. 8) when the amount of changes is a medium amount (a medium level of radiation dose is irradiated).

The ADC 54 converts the analogue electrical signals that have been amplified according to the amplification factor into a digital signal for output to the control section 106. The control section 106 subjects the converted digital signal to specific process, performs interpolation process on the specific processed-image data to interpolate image data for the radiation detection pixels 20B, and generates a radiographic image expressing irradiated radiation.

Then at step 1100, determination is made as to determine whether the radiographic imaging process has finished. When another charge accumulation period is provided to follow after the read out period, for example when imaging a video image, a negative determination is made, and the process returns to step 1000. Then, the current process (radiographic imaging operation) is then repeated. However, if an affirmative determination is made, the radiographic imaging process is finished, and the current process is ended.

As explained above, in the radiographic imaging device 100 of the present exemplary embodiment, when radiation is irradiated, the control section 106 determines the amplification factor of the amplification circuits 50 of the signal detection circuits 105, based on the electrical signals output from the radiation detection pixels 20B during the charge accumulation period. Further, corresponding to charges generated according to the radiation, the control section 106 controls the amplification factor of the amplification circuits 50 by setting the determined amplification factor in the amplification circuits 50. In the signal detection circuits 105 of the radiation detection element 10, the electrical signals corresponding to the charges accumulated in the charge accumulation period are amplified by the amplification circuits 50 with the set amplification factor, converted into digital signals by the ADC 54, and output to the control section 106.

Accordingly, in the present exemplary embodiment, control is implemented such that the control section 106 sets the amplification factor based on the electrical signals output from the radiation detection pixels 20B during the charge accumulation period prior to reading out the charges that was accumulated in the charge accumulation period. Consequently, the amplification factor of the amplification circuits 50 can be set to an amplification factor (gain) appropriate to the radiation dose of irradiated radiation. Reading out charges with an appropriate amplification factor enables the signal-to-noise (S/N) ratio to be improved.

In the radiographic imaging device 100 of the present exemplary embodiment, a portion of the pixels 20 of the radiation detection element 10 are employed as the radiation detection pixels 20B, and the electrical signals obtained therefrom in the charge accumulation period is employed. Accordingly, the circuit scale of the radiation detection element 10 may be made smaller than a configuration in which a device for radiation detection (for example, in conventional technology a current detection means and radiation monitor) is separately provided in addition to the pixels 20 of the radiation detection element 10. Consequently, the amplification factor may be set with high precision according to the irradiated radiation while suppressing increase in size of the radiographic imaging device 100. Accordingly, in comparison to conventional radiographic imaging devices, the present exemplary embodiment may reduce the manufacturing cost.

In the radiographic imaging device 100 of the present exemplary embodiment, the amplification factor of the amplification circuits 50 is set according to the electrical signals output during the charge accumulation period from the pixels 20 of the radiation detection element 10. Light converted by the scintillator is also detected by the sensor sections 103 similarly to in normal radiographic imaging (reading during the charge read out period). Accordingly, the present exemplary embodiment may achieve stable amplification factor determination, without the discrepancies in sensitivity, which may arise in conventional technology, between radiation detection and imaging due to the conditions of radiation irradiated.

Figure 9:
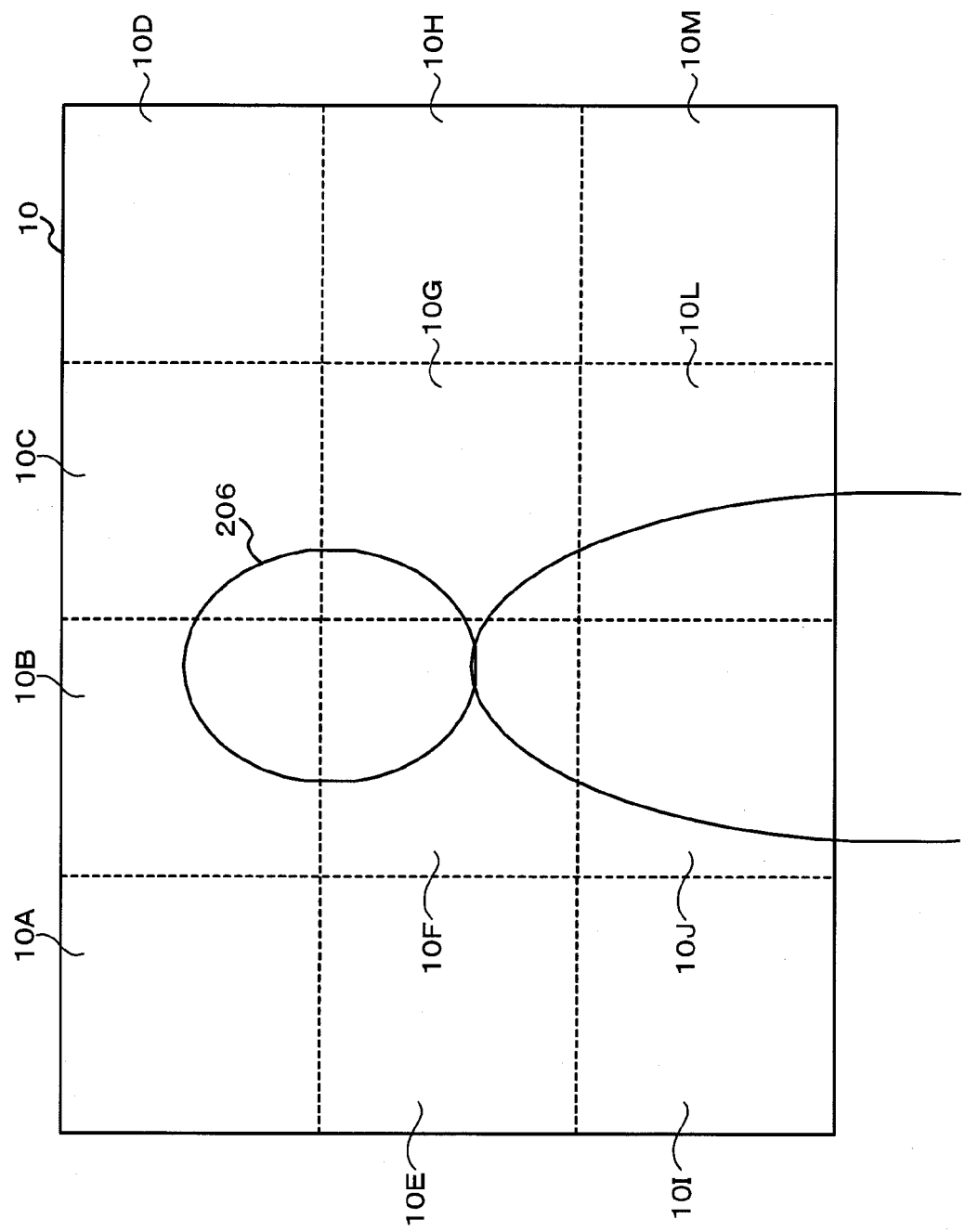
FIG. 9 is an explanatory diagram of setting an amplification factor of an amplification circuit according to an imaging position of an investigation subject with an radiographic imaging device according to the present exemplary embodiment.

Configuration may be made such that, the radiation detection pixels 20B employed for acquiring the electrical signals during the charge accumulation period (employed for acquiring the charge information which the control section 106 reads to use for setting the amplification factor) are all of the pixels 20B (provided to the radiation detection element 10) out of the pixels 20, or may be only radiation detection pixel (s) 20B located at positions corresponding to the imaging position of the investigation subject 206. Acquiring the charge information from the radiation detection pixels 20B at a position corresponding to the imaging position of the investigation subject 206 (a position for irradiation of radiation that has passed through the investigation subject 206) enables the amplification factor of the amplification circuits 50 of the signal detection circuit 105 to be appropriately set in real time during imaging a radiographic image of the imaging position of the investigation subject 206. For example, as shown in FIG. 9, the radiation detection element 10 may be divided into plural regions, the region corresponding to the imaging position of the investigation subject 206 stipulated by an imaging technician, such as through the control device 202 from out of radiation detection element regions 10A to 10M. The control section 106 then sets the amplification factor according to the charge information output from the radiation detection pixels 20B contained in the stipulated region(s).

Figure 10:
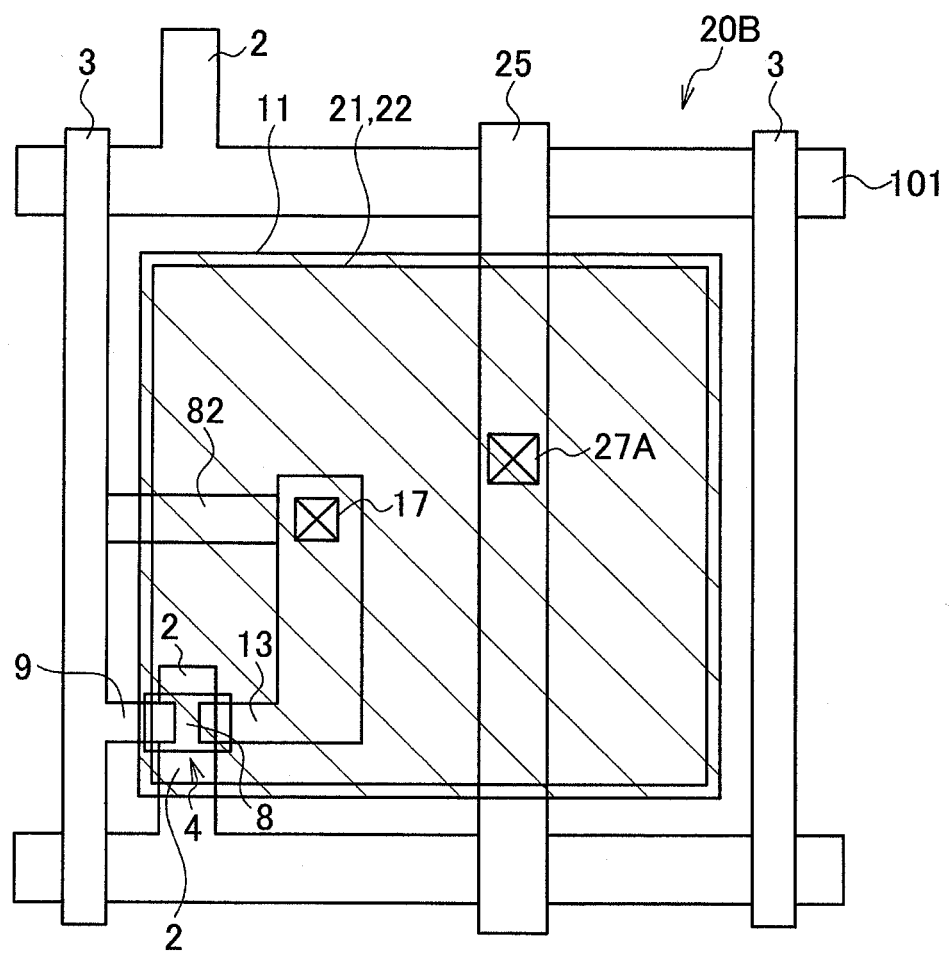
FIG. 10 is a plan view illustrating a configuration of a radiation detection element according to an alternative exemplary embodiment.
Figure 11:
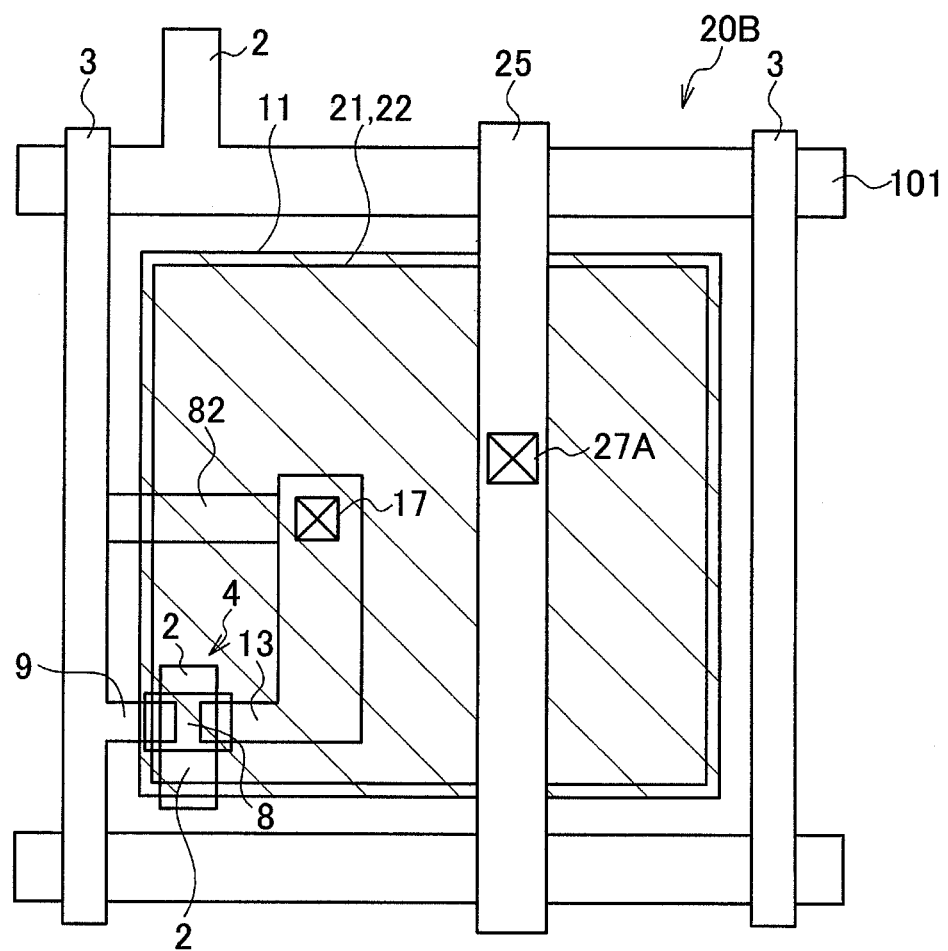
FIG. 11 is a plan view illustrating a configuration of a radiation detection element according to an alternative exemplary embodiment.

In the above exemplary embodiments, cases in which the control section 106 employs the pixels 20A for acquiring image data during the charge accumulation period and for radiation detection employs the pixels 20B configured with TFT switches 4 that have been shorted between the source and the drain, have been described. However, the pixels 20 for acquiring image data during the charge accumulation period are not limited thereto. For example, as shown in FIG. 10, a connection line 82 may be formed from part-way along the drain electrode 13 and connected to the signal line 3. Such cases effectively result in shorting between the source and the drain of the TFT switch 4. When shorting between the source and the drain of the TFT switch 4 in the above exemplary embodiments and as shown in FIG. 10, configuration may also be made, with a gate electrode 2 formed so as to be separated from the scan line 101, as shown in FIG. 11.

Figure 12:
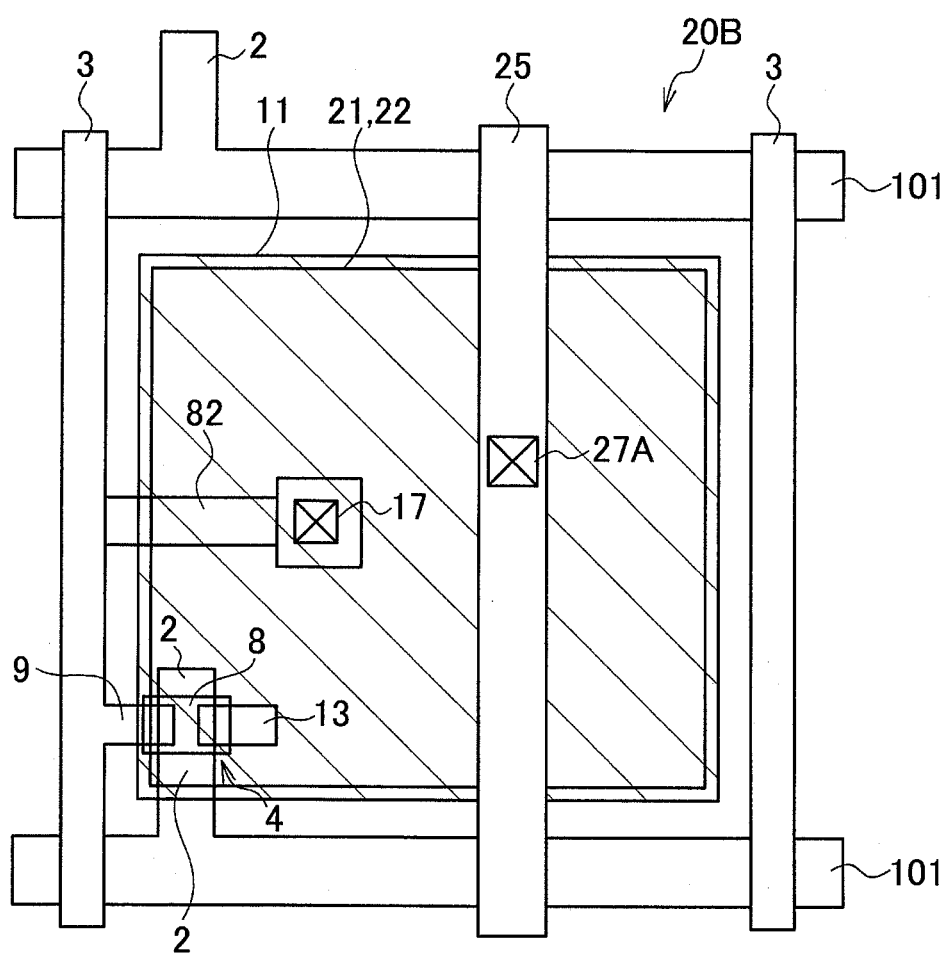
FIG. 12 is a plan view illustrating a configuration of a radiation detection element according to an alternative exemplary embodiment.

Furthermore, as shown in FIG. 12, in each of the radiation detection pixels 20B, the connection line 82 may be formed and the sensor section 103 and the signal line 3 may be connected through the connection line 82. Further, the contact hole 17, and electrical connection between the drain electrode 13 and the contact hole 17 may be cut.

Furthermore, in the above exemplary embodiments, cases in which pixels with shorted TFT switches 4 are employed for the radiation detection pixels 20B, have been described. However, non-shorted TFT switches 4 may be employed as the radiation detection pixels 20B. In such case, control of the TFT switches 4 of the pixels 20B may be independently controlled from the control of the TFT switches 4 of the pixels 20A. In such case, specific pixels 20 in the radiation detection element 10, or separate pixels from the pixels 20 may be provided as the pixels 20B in the radiation detection element 10.

In the radiation detection element 10 according to the present exemplary embodiment (see FIG. 2), the radiation detection pixels 20B are connected to a portion of the signal lines 3. However, the present invention is not limited thereto. The radiation detection pixels 20B may be provided to all of the signal lines 3.

In the present exemplary embodiments, the control section 106 sets a single amplification factor in all of the amplification circuits 50 (all of the amplification circuits 50 connected to the signal lines 3) based on the charge information expressing the acquired electrical signals. However, the present invention is not limited thereto. The control section 106 may set the amplification factor separately for each of the amplification circuits 50 (for each of the signal lines 3).

The configurations and operation of the radiographic imaging device 100, the radiation detection element 10 and the like explained in the present exemplary embodiments are merely examples. Obviously various changes are possible according to circumstances within a scope not departing from the spirit of the present invention.

There is no particular limitation to the radiation employed in the present exemplary embodiment of the present invention, and radiation such as X-rays and gamma rays may be employed.

What is claimed is:

1. A radiographic imaging device comprising:
   a plurality of pixels each comprising,
      a generation section that generates charges according to irradiated radiation,
      an accumulation section that accumulates charges generated by the generation section, and
      a switching element that reads out the charges accumulated in the accumulation section, and that outputs electrical signals corresponding to the charges;
   an amplification section that amplifies the electrical signals output from the switching elements; and
   a setting section that sets an amplification factor of the amplification section corresponding to the charges accumulated during an accumulation period, during which charges are accumulated, based on the electrical signals output from radiation detection pixels, that are predetermined among the plurality of pixels as pixels for detecting radiation, during the accumulation period,
   wherein the radiation detection pixels each include a shorted switching element that reads out the charges and outputs the electrical signals corresponding to the charges, irrespective of a switching state.

2. The radiographic imaging device of claim 1, wherein a plurality of signal lines are connected to the plurality of pixels, and
   wherein the setting section sets the amplification factor of the amplification section based on the electrical signals output from the radiation detection pixels that are connected to a portion of the signal lines.

3. The radiographic imaging device of claim 2 wherein the amplification section is provided for each of the plurality of signal lines, and the setting section sets the same amplification factor in all of the amplification sections.

4. The radiographic imaging device of claim 1 wherein the setting section sets the amplification factor in the amplification section based on electrical signals output from the radiation detection pixels provided at a position corresponding to the imaging position of an investigation subject for radiographic imaging.

5. A radiographic imaging method of an radiographic imaging device comprising a plurality of pixels each comprising a generation section that generates charges according to irradiated radiation, an accumulation section that accumulates charges generated by the generation section, and a switching element that read out the charges accumulated in the accumulation section, and that outputs an electrical signals corresponding to the charges, and an amplification section that amplifies the electrical signals output from the switching elements, the method comprising:

setting an amplification factor of the amplification section corresponding to the charges accumulated during an accumulation period, during which charges are accumulated, based on the electrical signals output from radiation detection pixels, that are predetermined among the plurality of pixels as pixels for detecting radiation, during the accumulation period; and output an image data corresponding to the electric signals amplified with the set amplification factor wherein the radiation detection pixels each include a shorted switching element that reads out the charges and outputs the electrical signals corresponding to the charges, irrespective of a switching state.

6. A computer readable storage medium storing a radiographic imaging program for causing a computer to perform a process for imaging a radiographic image with a radiographic imaging device comprising a plurality of pixels each comprising, a generation section that generates charges according to irradiated radiation, an accumulation section that accumulates charges generated by the generation section, and a switching element that read out the charges accumulated in the accumulation section, and that outputs electrical signals corresponding to the charges, and an amplification section that amplifies the electrical signals output from the switching elements, the process comprises:

setting an amplification factor of the amplification section corresponding to the charges accumulated during an accumulation period, during which charges are accumulated, based on the electrical signals output from radiation detection pixels, that are predetermined among the plurality of pixels as pixels for detecting radiation, during the accumulation period; and output an image data corresponding to the electric signals amplified with the set amplification factor wherein the radiation detection pixels each include a shorted switching element that reads out the charges and outputs the electrical signals corresponding to the charges, irrespective of a switching state.

* * * * *